(12) United States Patent
Seibel et al.

(10) Patent No.: US 7,096,220 B1
(45) Date of Patent: Aug. 22, 2006

(54) WEB-BASED CUSTOMER PROSPECTS HARVESTER SYSTEM

(75) Inventors: John C. Seibel, Austin, TX (US); Yu Feng, Maplewood, NJ (US); Robert L. Foster, Austin, TX (US)

(73) Assignee: ReachForce, Inc., Austin, TX (US)

( * ) Notice: Subject to any disclaimer, the term of this patent is extended or adjusted under 35 U.S.C. 154(b) by 291 days.

(21) Appl. No.: 09/862,814

(22) Filed: May 21, 2001

Related U.S. Application Data

(60) Provisional application No. 60/206,772, filed on May 24, 2000.

(51) Int. Cl.
*G06F 7/00* (2006.01)
*G06F 15/16* (2006.01)

(52) U.S. Cl. .................. 707/10; 707/3; 707/104.1; 707/201; 709/201

(58) Field of Classification Search ............ 705/50–80; 707/1–200; 709/1–400
See application file for complete search history.

(56) References Cited

U.S. PATENT DOCUMENTS

| | | | |
|---|---|---|---|
| 4,914,586 A | 4/1990 | Swinehart et al. .......... 364/200 |
| 5,619,648 A | 4/1997 | Canale et al. .......... 395/200.01 |
| 5,649,114 A | 7/1997 | Deaton et al. .............. 395/214 |
| 5,659,469 A | 8/1997 | Deaton et al. .............. 395/214 |
| 5,787,422 A | 7/1998 | Tukey et al. .................... 707/5 |
| 5,809,481 A | 9/1998 | Baron et al. ................... 705/14 |
| 5,897,622 A | 4/1999 | Blinn et al. .................... 705/26 |
| 5,924,068 A | 7/1999 | Richard et al. ............. 704/260 |
| 5,924,105 A | 7/1999 | Punch, III et al. .......... 707/513 |
| 5,931,907 A * | 8/1999 | Davies et al. ................ 709/218 |
| 5,974,398 A | 10/1999 | Hanson et al. ................ 705/14 |
| 5,987,247 A | 11/1999 | Lau ............................. 395/702 |
| 5,999,927 A | 12/1999 | Tukey et al. .................... 707/5 |
| 6,026,433 A | 2/2000 | D'Arlach et al. ........... 709/217 |
| 6,029,141 A | 2/2000 | Bezos et al. .................. 705/27 |
| 6,029,164 A | 2/2000 | Birrell et al. ................... 707/3 |
| 6,029,174 A | 2/2000 | Sprenger et al. ............ 707/103 |
| 6,029,195 A | 2/2000 | Herz ........................... 709/219 |
| 6,034,970 A | 3/2000 | Levac et al. ................. 370/466 |

(Continued)

FOREIGN PATENT DOCUMENTS

EP    1 162 558 A1    12/2001

(Continued)

OTHER PUBLICATIONS

Paul Dean, "Browsable OLAP Apps on SQL Server Analysis Services," Intelligent Enterprise Magazine, product review, 5 pages, May 7, 2001.

(Continued)

*Primary Examiner*—Greta Robinson
*Assistant Examiner*—Kuen S. Lu
(74) *Attorney, Agent, or Firm*—Baker Botts L.L.P.

(57) ABSTRACT

A web-based customer lead harvesting system. The system is based on an application service model, with the programming for the system being accessible to users of the system via web browsers and the Internet. The users, who are typically business enterprises, may access the system to search unstructured Internet data to obtain leads for prospective customers. The system accepts criteria from the user that describes a type or types of potential customers, as well as addresses of Internet sites of interest. A crawler process retrieves the web site data, and stores the data in a web archive. A harvester process then searches the Internet data according to the client-provided criteria. The system returns the names or the identifying information about the prospect together with a link to the document that verifies the prospect's match to the criteria.

3 Claims, 3 Drawing Sheets

U.S. PATENT DOCUMENTS

| | | | |
|---|---|---|---|
| 6,055,510 A | 4/2000 | Henrick et al. | 705/14 |
| 6,058,398 A | 5/2000 | Lee | 707/104 |
| 6,058,418 A | 5/2000 | Kobata | 709/221 |
| 6,078,891 A | 6/2000 | Riordan et al. | 705/10 |
| 6,105,055 A * | 8/2000 | Pizano et al. | 709/204 |
| 6,134,548 A | 10/2000 | Gottsman et al. | 707/5 |
| 6,145,003 A * | 11/2000 | Sanu et al. | 709/225 |
| 6,148,289 A * | 11/2000 | Virdy | 705/1 |
| 6,151,582 A | 11/2000 | Huang et al. | 705/8 |
| 6,151,601 A | 11/2000 | Papierniak et al. | 707/10 |
| 6,154,766 A | 11/2000 | Yost et al. | 709/201 |
| 6,170,011 B1 | 1/2001 | Macleod Beck et al. | 709/224 |
| 6,199,081 B1 | 3/2001 | Meyerzon et al. | 707/513 |
| 6,202,210 B1 | 3/2001 | Ludtke | 725/20 |
| 6,212,178 B1 | 4/2001 | Beck et al. | 370/352 |
| 6,226,623 B1 | 5/2001 | Schein et al. | 705/35 |
| 6,233,575 B1 | 5/2001 | Agrawal et al. | 707/6 |
| 6,236,975 B1 | 5/2001 | Boe et al. | 705/7 |
| 6,256,623 B1 | 7/2001 | Jones | 707/3 |
| 6,262,987 B1 * | 7/2001 | Mogul | 370/400 |
| 6,263,334 B1 | 7/2001 | Fayyad et al. | 707/5 |
| 6,282,548 B1 * | 8/2001 | Burner et al. | 707/104.1 |
| 6,289,342 B1 | 9/2001 | Lawrence et al. | 707/7 |
| 6,332,154 B1 | 12/2001 | Beck et al. | 709/204 |
| 6,338,066 B1 | 1/2002 | Martin et al. | 707/10 |
| 6,345,288 B1 | 2/2002 | Reed et al. | 709/201 |
| 6,381,599 B1 | 4/2002 | Jones et al. | 707/5 |
| 6,393,465 B1 | 5/2002 | Leeds | 709/207 |
| 6,401,091 B1 | 6/2002 | Butler et al. | 707/10 |
| 6,401,118 B1 * | 6/2002 | Thomas | 709/224 |
| 6,405,197 B1 | 6/2002 | Gilmour | 707/5 |
| 6,430,545 B1 | 8/2002 | Honarvar et al. | 706/47 |
| 6,430,624 B1 * | 8/2002 | Jamtgaard et al. | 79/246 |
| 6,434,544 B1 | 8/2002 | Bakalash et al. | 707/2 |
| 6,434,548 B1 | 8/2002 | Emens et al. | 707/3 |
| 6,438,543 B1 | 8/2002 | Kazi et al. | 707/5 |
| 6,460,038 B1 | 10/2002 | Khan et al. | 707/10 |
| 6,460,069 B1 * | 10/2002 | Berlin et al. | 709/201 |
| 6,473,756 B1 | 10/2002 | Ballard | 707/6 |
| 6,477,536 B1 | 11/2002 | Pasumansky et al. | 707/102 |
| 6,480,842 B1 | 11/2002 | Agassi et al. | 707/4 |
| 6,480,885 B1 * | 11/2002 | Olivier | 709/207 |
| 6,490,582 B1 | 12/2002 | Fayyad et al. | 707/6 |
| 6,490,620 B1 | 12/2002 | Ditmer et al. | 709/224 |
| 6,493,703 B1 | 12/2002 | Knight et al. | 707/3 |
| 6,510,432 B1 * | 1/2003 | Doyle | 707/10 |
| 6,516,337 B1 * | 2/2003 | Tripp et al. | 709/202 |
| 6,519,571 B1 | 2/2003 | Guheen et al. | 705/14 |
| 6,529,909 B1 | 3/2003 | Bowman-Amuah | 707/10 |
| 6,546,416 B1 | 4/2003 | Kirsch | 709/206 |
| 6,555,738 B1 | 4/2003 | Hughes et al. | 84/609 |
| 6,557,008 B1 | 4/2003 | Temple, III et al. | 707/104.1 |
| 6,567,797 B1 | 5/2003 | Schuetze et al. | 707/2 |
| 6,567,803 B1 | 5/2003 | Ramasamy et al. | 707/4 |
| 6,574,619 B1 | 6/2003 | Reddy et al. | 707/2 |
| 6,578,009 B1 | 6/2003 | Shinozaki | 705/10 |
| 6,581,054 B1 | 6/2003 | Bogrett | 707/4 |
| 6,598,054 B1 | 7/2003 | Schuetze et al. | 707/103 |
| 6,606,644 B1 | 8/2003 | Ford et al. | 709/203 |
| 6,609,124 B1 | 8/2003 | Chow et al. | 707/5 |
| 6,611,829 B1 | 8/2003 | Nwabueze | 707/101 |
| 6,621,505 B1 | 9/2003 | Beauchamp et al. | 345/764 |
| 6,625,598 B1 | 9/2003 | Kraffert | 707/3 |
| 6,651,048 B1 | 11/2003 | Agrwal et al. | 707/2 |
| 6,651,055 B1 | 11/2003 | Kilmer et al. | 707/3 |
| 6,651,065 B1 | 11/2003 | Brown et al. | 707/10 |
| 6,665,658 B1 | 12/2003 | DaCosta et al. | 707/3 |
| 6,668,259 B1 | 12/2003 | Ventura et al. | 707/103 |
| 6,677,963 B1 | 1/2004 | Mani et al. | 345/764 |
| 6,684,207 B1 | 1/2004 | Greenfield et al. | 707/3 |
| 6,684,218 B1 | 1/2004 | Santos et al. | 707/102 |
| 6,691,105 B1 | 2/2004 | Virdy | 707/3 |
| 6,700,575 B1 | 3/2004 | Bovarnick et al. | 345/440 |
| 6,700,590 B1 | 3/2004 | DeMesa et al. | 345/744 |
| 6,714,979 B1 * | 3/2004 | Brandt et al. | 709/225 |
| 6,721,689 B1 | 4/2004 | Markle et al. | 702/188 |
| 6,732,161 B1 * | 5/2004 | Hess et al. | 709/219 |
| 6,757,689 B1 | 6/2004 | Battas et al. | 707/101 |
| 6,769,009 B1 * | 7/2004 | Reisman | 709/201 |
| 6,772,196 B1 | 8/2004 | Kirsch et al. | 709/206 |
| 6,795,830 B1 | 9/2004 | Banerjee et al. | 707/200 |
| 6,804,704 B1 | 10/2004 | Bates et al. | 709/217 |
| 6,845,370 B1 | 1/2005 | Burkey et al. | 707/3 |
| 6,868,395 B1 | 3/2005 | Szlam et al. | 705/27 |
| 2001/0020242 A1 | 9/2001 | Gupta et al. | 707/501.1 |
| 2001/0052003 A1 * | 12/2001 | Seki et al. | 709/219 |
| 2001/0054004 A1 | 12/2001 | Powers | 705/14 |
| 2001/0056366 A1 | 12/2001 | Naismith | 705/10 |
| 2002/0016735 A1 | 2/2002 | Runge et al. | 705/14 |
| 2002/0032603 A1 * | 3/2002 | Yeiser | 705/14 |
| 2002/0032725 A1 * | 3/2002 | Araujo et al. | 709/203 |
| 2002/0035501 A1 | 3/2002 | Handel et al. | 705/10 |
| 2002/0035568 A1 | 3/2002 | Benthin et al. | 707/102 |
| 2002/0038299 A1 * | 3/2002 | Zernik et al. | 707/3 |
| 2002/0046138 A1 | 4/2002 | Fitzpatrick et al. | 705/27 |
| 2002/0049622 A1 | 4/2002 | Lettich et al. | 705/7 |
| 2002/0072982 A1 * | 6/2002 | Barton et al. | 705/26 |
| 2002/0073058 A1 * | 6/2002 | Kremer et al. | 707/1 |
| 2002/0087387 A1 | 7/2002 | Calver et al. | 705/10 |
| 2002/0107701 A1 * | 8/2002 | Batty et al. | 705/1 |
| 2002/0116362 A1 | 8/2002 | Li et al. | 707/1 |
| 2002/0143870 A1 * | 10/2002 | Rau | 709/204 |
| 2002/0161685 A1 * | 10/2002 | Dwinnell | 705/36 |
| 2002/0178166 A1 | 11/2002 | Hsia | 707/100 |
| 2003/0040845 A1 | 2/2003 | Spool et al. | 700/291 |
| 2003/0065805 A1 | 4/2003 | Barnes, Jr. | 709/231 |
| 2003/0083922 A1 | 5/2003 | Reed | 705/9 |
| 2003/0120502 A1 | 6/2003 | Robb et al. | 705/1 |
| 2003/0139975 A1 | 7/2003 | Perkowski | 705/26 |
| 2004/0002887 A1 | 1/2004 | Fliess et al. | 705/9 |

FOREIGN PATENT DOCUMENTS

| | | |
|---|---|---|
| WO | 95/30201 | 11/1995 |
| WO | 98/21679 | 5/1998 |
| WO | 98/49641 | 11/1998 |
| WO | 99/66446 | 12/1999 |
| WO | 00/23929 | 4/2000 |
| WO | 01/22692 | 3/2001 |

OTHER PUBLICATIONS

Journyx and IBM team to deliver enterprise project and time tracking software, article, 3 pages, Apr. 5, 1999.

Optio Software, Inc. NEWS: Optio Software and Syntax.net Reseller Partnership Offers a Robust Solution to Provider and Deliver Customized Documents to Support E-Business and Extend the Reach of the Global Enterprise, 2 pages Dec. 7, 1989.

Andreas Geyer-Schultz et al., "A customer purchase incidence model applied to recommender services" WEBKDD 2001 Mining Log data across all customer touch points, third international workshop, p. 1-11 Aug. 26, 2001.

Adomavicius et al., "*Using Data Mining Methods to Build Customer Profiles*", IEEE 2001 computer, pp. 74-82.

Delen et al., "*An Integrated Toolkit for Enterprise Modeling and Analysis*", Proceedings of the 1999 winter Simulation conference, pp. 289-297.

Griffin et al., "*Enterprise Customer Relationship Management*", DM review, 15 pages, Dec. 1999.

Parkhomenko et al., "*Personalization Using Hybrid Data Mining Approaches in E-Business Applications*", Amer. assoc. for Artificial Intelligence, 7 pages, 2002.

Weiss, Gary M., "*Data Mining in Telecommunications*", 13 pages, no date.

Beantree, "Enterprise Business Application Architecture" Enterprise Business Components Whitepaper, 5 pages.

Lee et al., "An enterprise intelligence system intergrating WWW intranet resource" IEEE Xplore Release 1.8, pp. 28-35 with abstract.

Mathur, Srita, "Creating Unique Customer Experiences: The New Business Model of Cross-Enterprise Integration" IEEE Xplore Release 1.8, pp. 76-81 with abstract.

Warlick, David, "Searching the Internet: Part III", Raw Materials for the Mind: Teaching & Learning in Information & Technology, Rich Schools, ISBN 0-9667432-0-2.

Pervasive Solution Sheet "Havesting Unstructured Data", 5 pages.

Key Building Blocks for Knowledge Management Solutions, "IBM Intelligent Miner for Text" 2 pages.

Wood, David, "Metadata Searches of Unstructured Textual Content," Tucana Plugged in Software white Paper, 4 pages.

* cited by examiner

WEB-BASED CUSTOMER PROSPECTS HARVESTER SYSTEM

RELATED PATENT APPLICATIONS

This application claims the benefit of U.S. Provisional Application No. 60/206,772, filed May 24, 2000 and entitled "Server Log File System Utilizing Text Mining Methodologies and Technologies". The present patent application and additionally the following patent applications are each conversions from the foregoing provisional filing: patent application Ser. No. 09/862,832 entitled "Web-Based Customer Lead Generator System" and filed May 21, 2001; patent application Ser. No. 09/865,802 entitled "Database Server System for Web-Based Business Intelligence" and filed May 24, 2001; patent application Ser. No. 09/865,804 entitled "Data Mining System for Web-Based Business Intelligence" and filed May 24, 2001; patent application Ser. No. 09/865,735 entitled "Text Mining System for Web-Based Business Intelligence" and filed May 24, 2001; patent application Ser. No. 09/865,805 entitled "Text Indexing System for Web-Based Business Intelligence" and filed May 24, 2001.

TECHNICAL FIELD OF THE INVENTION

This invention relates to electronic commerce, and more particularly to a method of acquiring leads for prospective customers, using Internet data sources.

BACKGROUND OF THE INVENTION

Most small and medium sized companies face similar challenges in developing successful marketing and sales campaigns. These challenges include locating qualified prospects who are making immediate buying decisions. It is desirable to personalize marketing and sales information to match those prospects, and to deliver the marketing and sales information in a timely and compelling manner. Other challenges are to assess current customers to determine which customer profile produces the highest net revenue, then to use those profiles to maximize prospecting results. Further challenges are to monitor the sales cycle for opportunities and inefficiencies, and to relate those findings to net revenue numbers.

Today's corporations are experiencing exponential growth to the extent that the volume and variety of business information collected and accumulated is overwhelming. Further, this information is found in disparate locations and formats. Finally, even if the individual data bases and information sources are successfully tapped, the output and reports may be little more than spreadsheets, pie charts and bar charts that do not directly relate the exposed business intelligence to the companies' processes, expenses, and to its net revenues.

With the growth of the Internet, one trend in developing marketing and sales campaigns is to gather customer information by accessing Internet data sources. Internet data intelligence and data mining products face specific challenges. First, they tend to be designed for use by technicians, and are not flexible or intuitive in their operation; secondly, the technologies behind the various engines are changing rapidly to take advantage of advances in hardware and software, and finally, the results of their harvesting and mining are not typically related to specific goals and objectives.

SUMMARY OF THE INVENTION

One aspect of the invention is a web-based computer system for providing, to a business enterprise client, customer lead information from Internet sources. Overall, the system may be described as an application service system, having a crawler process that retrieves specified Internet web site data, and a web archive for storing the unstructured data. A harvester process is programmed to accept client criteria describing business prospects and their attributes, to search unstructured Internet data for prospects matching those criteria and their attributes, and to deliver the results of the search to the client with a link to a document that verifies the prospect's match to the criteria. As with conventional application service systems, it is accessible by client browser systems via the Internet.

DETAILED DESCRIPTION OF THE INVENTION

Lead Generator System Overview

Figure 1:
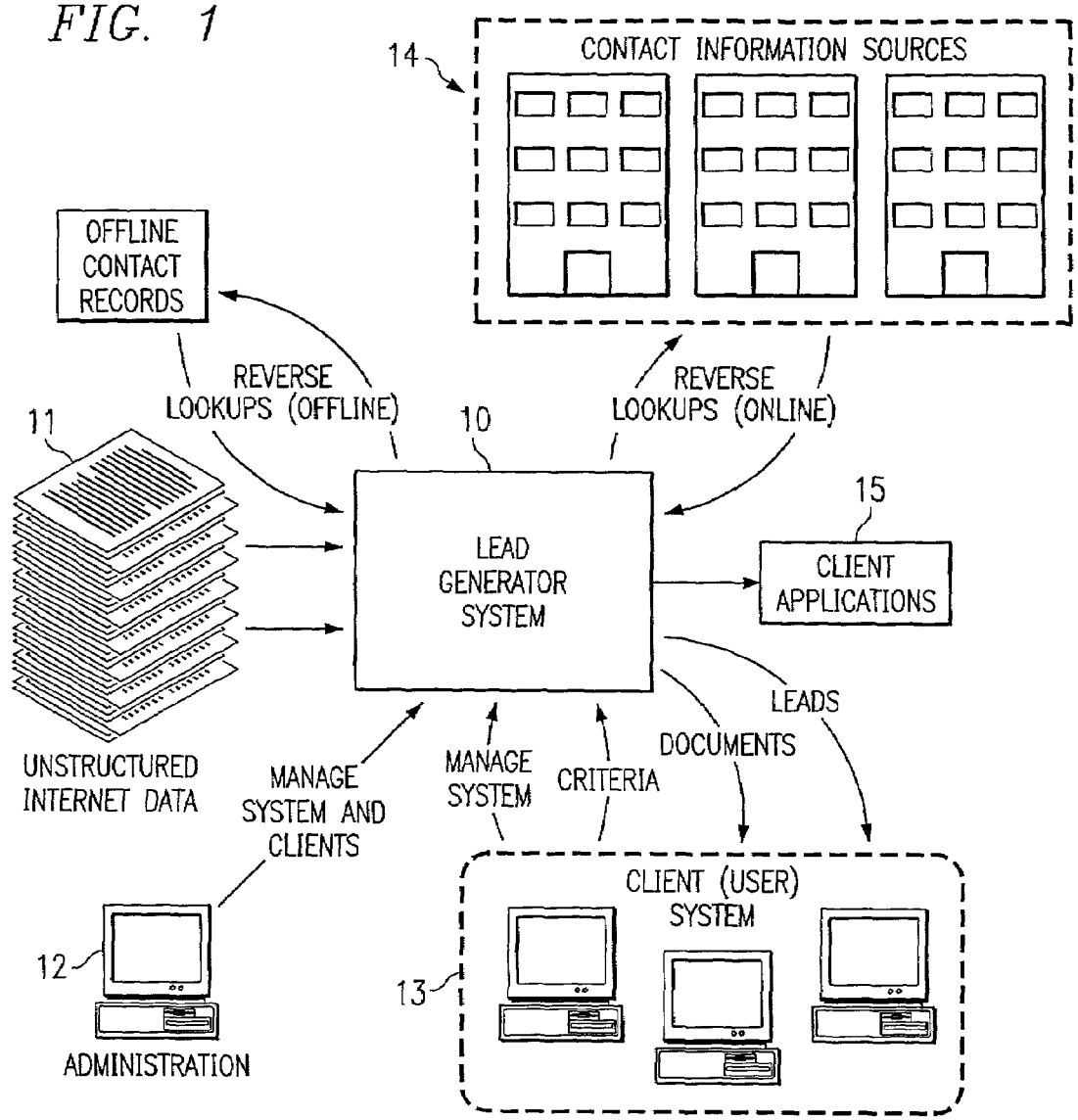
FIG. 1 illustrates the operating environment for a web based lead generator system in accordance with the invention.

FIG. 1 illustrates the operating environment for a web-based customer lead generation system 10 in accordance with the invention. System 10 is in communication, via the Internet, with unstructured data sources 11, an administrator 12, client systems 13, reverse look-up sources 14, and client applications 15.

The users of system 10 may be any business entity that desires to conduct more effective marketing campaigns. For example, these users may be direct marketers who wish to maximizing the effectiveness of direct sales calls, or e-commerce web sites who wish to build audiences.

In general, system 10 may be described as a web-based Application Service Provider (ASP) data collection tool. The general purpose of system 10 is to analyze a client's marketing and sales cycle in order to reveal inefficiencies and opportunities, then to relate those discoveries to net revenue estimates. Part of the latter process is proactively harvesting prequalified leads from external and internal data sources. As explained below, system 10 implements an automated process of vertical industry intelligence building that involves automated reverse lookup of contact information using an email address and key phrase highlighting based on business rules and search criteria.

More specifically, system 10 performs the following tasks:

Uses client-provided criteria to search Internet postings for prospects who are discussing products or services that are related to the client's business offerings Selects those prospects matching the client's criteria Pushes the harvested prospect contact information to the client, with a link to the original document that verifies the prospects interest Automatically opens or generates personalized sales scripts and direct marketing materials that appeal to the prospects' stated or implied interests Examines internal sales and marketing materials, and by applying data and text mining analytical tools, generates profiles of the client's most profitable customers Cross-references and matches the customer profiles with harvested leads to facilitate more efficient harvesting and sales presentations In the audience building environment, requests permission to contact the prospect to offer discounts on services or products that are directly or indirectly related to the conversation topic, or to direct the prospect to a commerce source.

System 10 provides open access to its web site. A firewall (not shown) is used to prevent access to client records and the entire database server. Further details of system security are discussed below in connection with FIG. 5.

Figure 2:
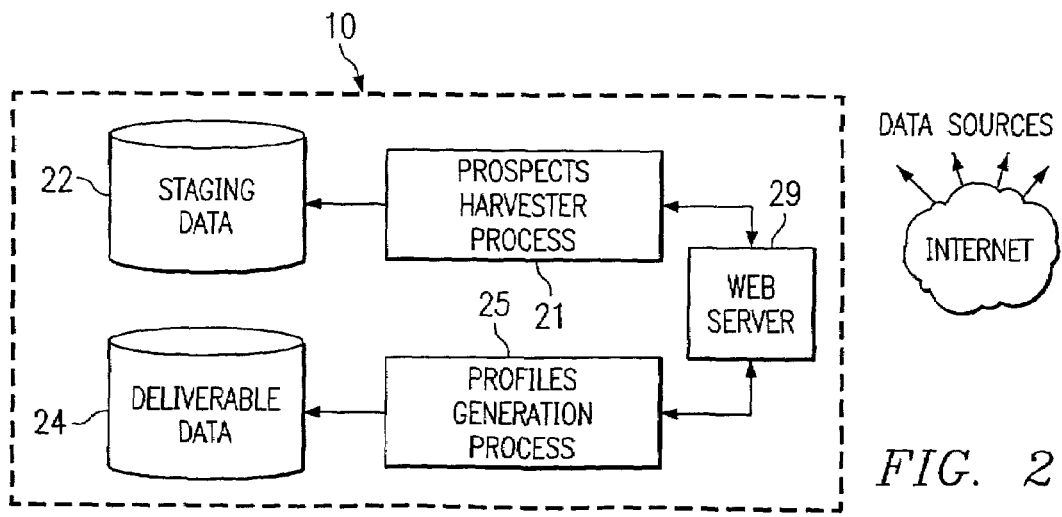
FIG. 2 illustrates the various functional elements of the lead generator system.

Consistent with the ASP architecture of system 10, interactions between client system 13 and system 10 will typically be by means of Internet access, such as by a web server 29 (see FIG. 2). Authorized client personnel will be able to create and modify profiles that will be used to search designated web sites and other selected sources for relevant prospects.

Client system 13 may be any computer station or network of computers having data communication to lead generator system 10. Each client system 13 is programmed such that each client has the following capabilities: a master user account and multiple sub user accounts, a user activity log in the system database, the ability to customize and personalize the workspace; configurable, tiered user access; online signup, configuration and modification, sales territory configuration and representation, goals and target establishment, and online reporting comparing goals to target (e.g., expense/revenue; budget/actual).

Administration system 12 performs such tasks as account activation, security administration, performance monitoring and reporting, assignment of master userid and licensing limits (user seats, access, etc.), billing limits and profile, account termination and lockout, and a help system and client communication.

System 10 interfaces with various client applications 15. For example, system 10 may interface with commercially available enterprise resource planning (ERP), sales force automation (SFA), call center, e-commerce, data warehousing, and custom and legacy applications.

Lead Generator System Architecture

FIG. 2 illustrates the various functional elements of lead generator system 10. In the embodiment of FIG. 2, the above described functions of system 10 are partitioned between two distinct processes.

A prospects harvester process 21 uses a combination of external data sources, client internal data sources and user-parameter extraction interfaces, in conjunction with a search, recognition and retrieval system, to harvest contact information from the web and return it to a staging data base 22. In general, process 21 collects business intelligence data from both inside the client's organization and outside the organization. The information collected can be either structured data as in corporate databases/spreadsheet files or unstructured data as in textual files.

Process 21 may be further programmed to validate and enhance the data, utilizing a system of lookup, reverse lookup and comparative methodologies that maximize the value of the contact information. Process 21 may be used to elicit the prospect's permission to be contacted. The prospect's name and email address are linked to and delivered with ancillary information to facilitate both a more efficient sales call and a tailored e-commerce sales process. The related information may include the prospect's email address, Web site address and other contact information. In addition, prospects are linked to timely documents on the Internet that verify and highlight the reason(s) that they are in fact a viable prospect. For example, process 21 may link the contact data, via the Internet, to a related document wherein the contact's comments and questions verify the high level value of the contact to the user of this system (the client).

A profiles generation process 25 analyzes the user's in-house files and records related to the user's existing customers to identify and group those customers into profile categories based on the customer's buying patterns and purchasing volumes. The patterns and purchasing volumes of the existing customers are overlaid on the salient contact information previously harvested to allow the aggregation of the revenue-based leads into prioritized demand generation sets. Process 25 uses an analysis engine and both data and text mining engines to mine a company's internal client records, digital voice records, accounting records, contact management information and other internal files. It creates a profile of the most profitable customers, reveals additional prospecting opportunities, and enables sales cycle improvements. Profiles include items such as purchasing criteria, buying cycles and trends, cross-selling and up-selling opportunities, and effort to expense/revenue correlations. The resulting profiles are then overlaid on the data obtained by process 21 to facilitate more accurate revenue projections and to enhance the sales and marketing process. The client may add certain value judgments (rankings) in a table that is linked to a unique lead id that can subsequently be analyzed by data mining or OLAP analytical tools. The results are stored in the deliverable database 24.

Data Sources

Figure 3:
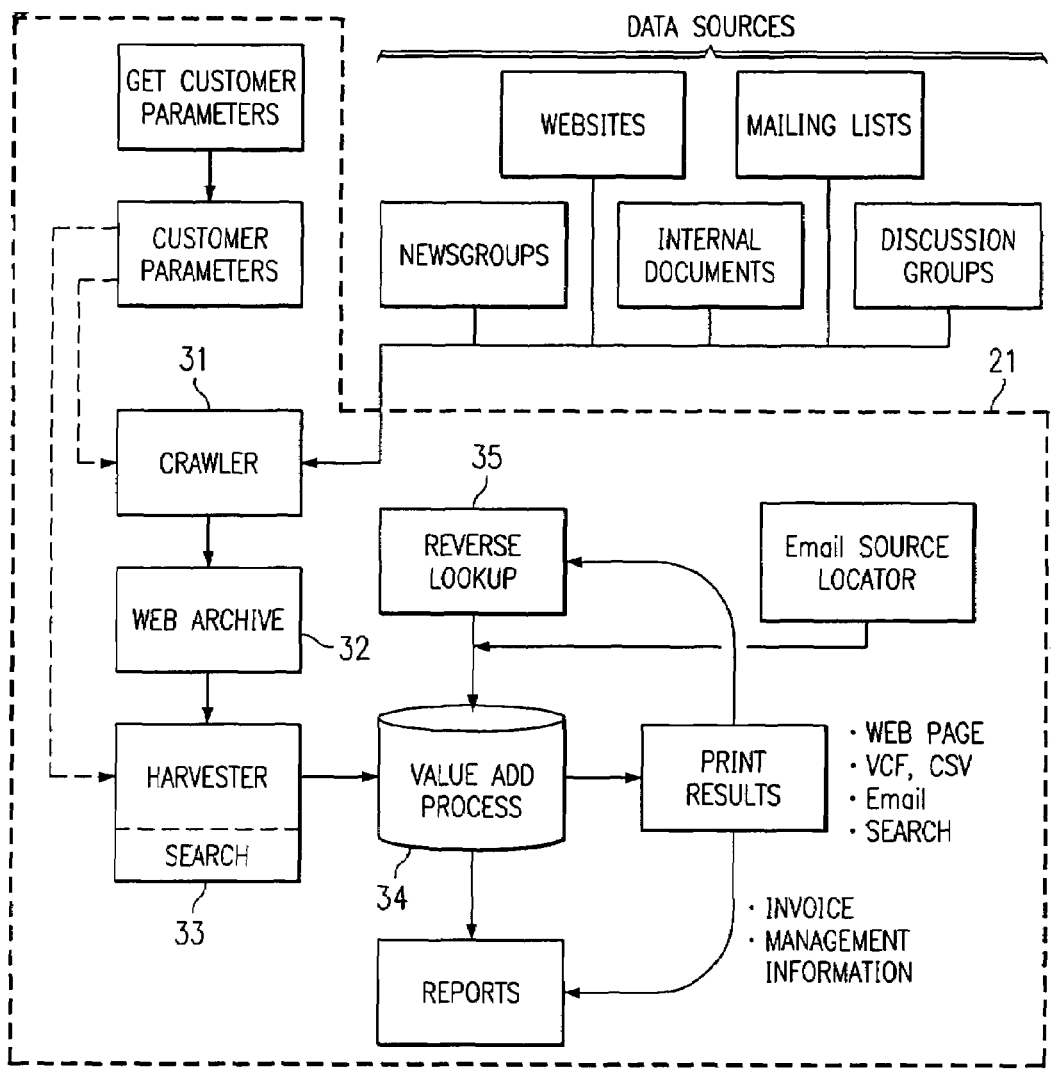
FIG. 3 illustrates a first embodiment of the prospects harvester.

FIG. 3 provides additional detail of the data sources of FIGS. 1 and 2. Access to data sources may be provided by various text mining tools, such as by the crawler process 31 or 41 of FIGS. 3 and 4.

One data source is newsgroups, such as USENET. To access discussion documents from USENET newsgroups such as "news.giganews.com", NNTP protocol is used by the crawler process to talk to a USENET news server such as "news.giganews.com." Most of news servers only archive news articles for a limited period (giganews.com archives news articles for two weeks), this crawler 31 incrementally downloads and archives these newsgroups periodically in a scheduled sequence. This aspect of crawler process 31 is controlled by user-specified parameters such as news server name, IP address, newsgroup name and download frequency, etc.

Another data source is web-Based discussion forums. The crawler process follows the hyper links on a web-based discussion forum, traverse these links to user or design specified depths and subsequently access and retrieve discussion documents. Unless the discussion documents are archived historically on the web site, the crawler process will download and archive a copy for each of the individual documents in a file repository. If the discussion forum is membership-based, the crawler process will act on behalf of the authorized user to logon to the site automatically in order to retrieve documents. This function of the crawler process is controlled by user specified parameters such as a discussion forum's URL, starting page, the number of traversal levels and crawling frequency.

A third data source is Internet-based or facilitated mailing lists wherein individuals send to a centralized location emails that are then viewed and/or responded to by members of a particular group. Once a suitable list has been identified a subscription request is initiated. Once approved, these emails are sent to a mail server where they are downloaded, stored in system 10 and then processed in a fashion similar to documents harvested from other sources. The system stores in a database the filters, original URL and approval information to ensure only authorized messages are actually processed by system 10.

A fourth data source is corporations' internal documents. These internal documents may include sales notes, customer support notes and knowledge base. The crawler process accesses corporations' internal documents from their Intranet file system or alternately through an ODBC connection. If internal documents are password-protected, crawler process 31 acts on behalf of the authorized user to logon to the file systems or databases and be able to subsequently retrieve documents. This function of the crawler process is controlled by user-specified parameters such as directory path and database ODBC path, starting file id and ending file id, and access frequency. Other internal sources are customer information, sales records, accounting records, and call center digital voice records.

A fifth data source is web pages from Internet web sites. This function of the crawler process is similar to the functionality associated with web-discussion-forums. Searches are controlled by user-specified parameters such as web site URL, starting page, the number of traversal levels and crawling frequency.

Prospects Harvesting From External and Internal Data Sources

Referring to FIG. 3, the prospects harvester process 21 of system 10 may be implemented so as to mine data from both internal and external sources.

Crawler process 31 is a background process (hourly, daily or weekly), operating on any of the sources described above. It performs an incremental newsgroup download and an incremental and traversal web page download. It may provide a robust interface with text fields in relational databases. Crawler process 31 operates in response to use input that specifies a particular web site or sites. Once downloaded, the Internet data is stored in a database 32.

Crawler process 31 may also be used for permission-based email. The crawler technology is applied to identify and extract emails. It applies marketing and business rules to generate email text that elicits permission from prospect. It may pass filtered and opt-in emails to client. This process may be automatically generated or generated manually by the client.

A harvester process 33 provides extraction of contact information from database 32, based on search criteria. Additional features are a thesaurus/synonym search, automatic email cleansing (remove standard "no spam" and distracter characters), comprehensive reverse lookup of value-add business information, and keyword-based sales prospects prioritizing.

A value-add process 34 provides robust and mandatory lead ranking and tracking functionality, operating either on-line or off-line. It reports basic customer and prospect profiling (i.e., purchasing criteria, time to purchase, pricing window or sensitivity). It may export and import from/to third party sales management or contact management system. It provides search and sub search based on keywords and business criteria, configurable synonym search (add/delete/modify list of related/similar word searches). It may prioritize leads based on keywords and business criteria. It reports potential revenue projections, user and management reporting of lead tracking (new, open, closed, results). It may perform auto email authoring that incorporates intelligent information from prospect's web document and internal business rules. It may further provide an enhanced document summary that contains a short synopsis of the web-based document's context.

A reverse look-up process 35 implements a cascade, multi-site web search for contact information on email addresses. It may search and parse a document for information, to include vcf-type data. It may use a standard reverse email lookup. It may perform a web site search, when email can be linked to a valid company/business URL. It may further parse an email address into name to be used in online white or yellow pages search. It is an intelligent process that eliminates obvious incorrect contacts. For example, if it is known that the contact is from Texas, eliminate all contacts that are not from that state/location.

Prospects Harvesting From External Data Sources

Figure 4:
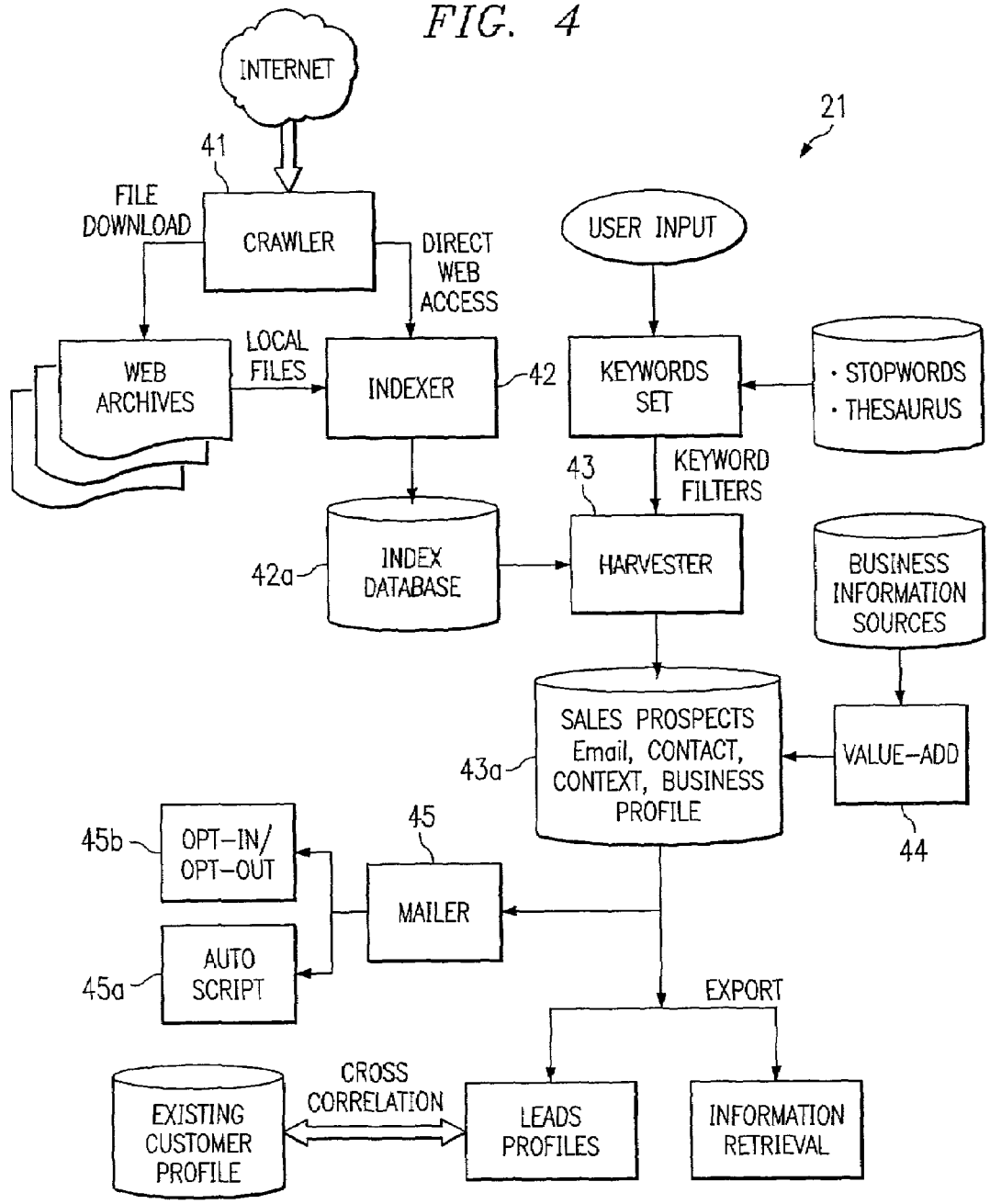
FIG. 4 illustrates a second embodiment of the prospects harvester.

FIG. 4 illustrates another implementation of the prospects harvesting process 21 of FIG. 2.

Crawler process 41 collects information and documents from the Internet. It archives these documents collected from different sources whenever necessary to keep a historical view of the business intelligence.

Indexer 42 indexes the documents retrieved by the crawler 41 and provides the interface for the client to perform searches and sub-searches on specific sets of documents. It also facilitates (1) document keyword highlighting, (2) the extraction of key phrases from documents and (3) subsequently generates a summary from those documents. ThemeScape, UdmSearch or similar packages may be used to index, search and present documents. Indexer process 42 provides support for multiple file formats such as HTML, DHTML, plain text (ASCII), Word document, RTF and relational database text fields. Indexer process 42 can either interact with crawler process 41 or access web file archives directly to retrieve documents in different formats (such as Text, HTML and Doc formats). These documents are then indexed and categorized with their keywords and/or key phrases, date of creation, a brief summary of the original documents and links to the original documents. Links may be either URLs, file path or a path to a database field. This indexing process will be performed on an ongoing basis as discussion articles and web pages are incrementally downloaded. The results are stored in a central location in the database for future access.

Harvester process 43 queries the index database 42a using user input keywords, default buyer phrases, synonyms related to the keywords and predefined stop words. The end results of this process are a set of documents linked to the original documents with preliminary ranking based on keyword relevance. Harvester process 43 then follows these links to extract an email address, telephone number and other contact information from the original documents, either through file archives or web pages on the Internet. The latter functions are based on a set of keywords and parameters specified by customers. The resulting information is then subsequently indexed and cleansed. These email addresses are then entered into a relational database that is cross-correlated with keywords, source, time stamp, demographics information and company profile information. The harvesting results may be organized and stored into the prospects database 43a with contact information, original document links and preliminary rankings.

A value-add process 44 adds robust business intelligence to the harvesting process by linking sales prospects with comprehensive and updated business profile information (such as industry, company size, company business focus and company purchasing budget). Key aspects of this value-add service is accomplished through partnerships with business information sources, such as Harte-Hanks, Hoovers and Dunn & Bradstreet. Reverse lookups may be performed against these business information sources. Combined with harvested business intelligence, this additional business profile information allows organizations to utilize personalized conversations with prospects, thus dramatically improving their sales close ratios and reducing the time and effort required to close the sale. The overall ranking of a sales prospect is based on the prospect's business profile, and the keyword relevance in harvested documents. Using a ranking algorithm, highly targeted and highly qualified sales/marketing prospects may be identified.

A mailer process 45 provides an auto-scripting utility for sales people to store pieces of their sales scripts in a knowledge base system. Once stored in the knowledge base they can be copied and pasted into a sales correspondence or used by an auto scripting tool 45a to generate sales correspondence on-the-fly based on the discussion context associated with sales leads. The mailer process 45 provides opt-in/opt-out interface 45b to the harvesting database. When the prospects receive a promotion or other sales correspondence, they will be given the choice to opt-in or opt-out from the lead system if they are not interested in receiving further information.

Security

Figure 5:
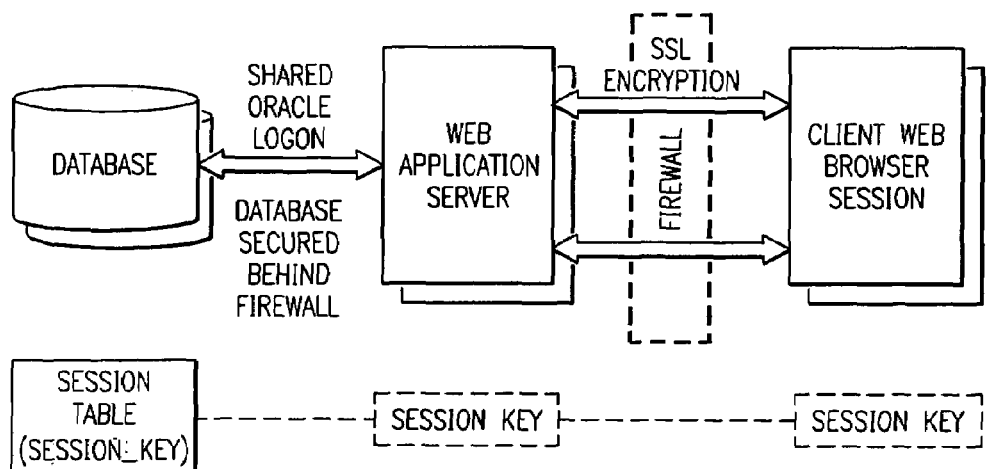
FIG. 5 illustrates the security features of the lead generator system.

FIG. 5 illustrates system security. For the security framework to work effectively, the following assumptions are made: database servers exist behind a properly configured firewall, the web server is located outside the firewall in order for users to be able to access the site and login, the application servers exist behind the same firewall, the only allowed traffic from outside the firewall is to the HTTP and HTTPS ports of the application servers. No other access is permitted.

The task of protecting the application servers and the database servers from unauthorized access attempts by individuals outside the firewall are completely owned by the firewall and thus prohibited. The only incoming traffic should be that which is going to HTTP, HTTPS, and perhaps FTP.

The application server must have an entirely open communication channel to the database servers. The application server will connect to the database server using a single logon account and password. It will open as many connections as necessary (all under this single username and password) and will pool all data requests from all users.

For each user and each session, a special "Security Key" 128 byte encoded string is assigned. Implemented both in the database servers, and in the application servers, this Security Key becomes a time-sensitive passcode that will prove the security authenticity of an incoming request. These security keys can expire after a configurable number of minutes, and they can be assigned only to one user and one session at a time. If a user tries to create two sessions, his first session instantly becomes invalid and no longer usable.

Username and password logons are stored in the database server. The application server fetches the user's input in these fields while logging on and reconciles them against the Logons table in the System Database. If a match is found a Security Key is generated, time-stamped, and linked to the user.

Hacking attempts on a username and password are tracked. For a specific account, sequential invalid logon attempts are counted and recorded. If the bad logon count exceeds the maximum, the account becomes "locked" and only a system administrator can unlock it.

To protect the superuser and admin accounts, these accounts can be restricted to a specific IP address or some other means of machine authentication to ensure that outside hackers have no means to hack into the "root" accounts.

Between the application server and database server is plain text no-encryption. Between the application server and the Internet browsers, there can be either no encryption, or any level of SSL encryption. SSL adds CPU load, but for certain areas of the site might be good to have in place.

Operational Scenario

Users will typically be sales representatives whose main objective is to quickly identify high quality leads and determine the reason for such qualification and best method to position their product or service for sale. Users will need to have control over an individual profile, login to their lead site, have a personal workspace which functions as their lead home, view leads on the screen and progressively drill down into: (1) contact information, (2) document summary and (3) original document with highlighted key phrases, perform multi-level searches and sub searches into their lead base by looking at all relevant documents in their set, generate scripted emails or print documents that includes business logic and intelligent extract from the original Internet document, close and rank leads based on subjective criteria, view lead performance reports on those leads within their area, rank leads by time to closure or estimated sale value.

A user session might follow these general steps: Login, User completes descriptors, User suggests sources, Launch search, Download, Cleanse, Harvest, Highlight, Cascade lookup, Prioritize prospects (date, time, rank, etc), Push to desktop, Web export.

System Platform

Referring again to FIGS. 1 and 2, the server functions of system 10 may be partitioned among more than one piece of equipment. Standard server equipment may be used, such as those capable of running Windows 2000 server software. Other software used to implement the invention may include: enterprise software, such as the software manufactured by ORACLE® or COLDFUSION®; search engine software, such as the software manufactured by VERITY® or THUNDERSTONE®; and report generation software, such as the software manufactured by COGNOS® or SEAGATE®.

System 10 is based on a client/server architecture. The server 29 of system 10 can reside on Windows NT/2000 Server, Sun Solaris (Unix), and AIX (Unix) architectures. The client may be any web browser that supports Java 1.1 (or higher) plug-in, such as Microsoft IE 4.0 (or higher), or Netscape Communicator 4.0 (or higher). These web browsers run on most major platforms, such as Windows95/98/NT/2000, Unix (Sun Solaris, AIX, Linux, etc), or OS/2 and MacOS.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A prospects harvesting system, maintained by an application service provider, for providing contact data representing information about prospective business customers of a product or service provided by a product/service provider, comprising:

a web crawler process operable to locate text documents from unstructured participant-based Internet discussion sites, the sites selected from the group of: newsgroups, discussion forums, and mailing lists;

an archive database for storing text documents retrieved by the crawler;

a harvester process for searching the archive database for primary personal contact data for at least one prospective customer of the product/service provider;

wherein the harvester process operates in response to a query from the product/service and locates at least one document in which a participant of the discussion site is discussing a specified product or service, thereby locating a prospective customer having associated primary contact data;

wherein the harvester process further provides relevance data associated with each search;

wherein the harvester process further provides a link to the document;

a reverse lookup process for receiving the primary contact data from the harvester process and for performing a reverse lookup from the primary contact data;

wherein the reverse lookup is performed by using the primary contact data to obtain ancillary contact data about the same prospective customer;

wherein the reverse lookup is a cascading multi-site process that accesses Internet data sources other than the discussion sites containing the primary contact data;

wherein the primary contact data and the ancillary contact data comprise at least two items of data from the following group: name, email address, telephone number, website address, geographical address, place of employment;

a value-add process that accesses business profile data about the business of one or more of the prospective customers, from a data source other than the source of the contact data, and ranks each prospective customer, using a ranking algorithm based on the profile data and the relevance data from the harvester process;

a validation process for validating all or part of the contact data;

a staging database for storing the primary and ancillary contact data;

a mailer process for scripting correspondence to prospective customers; and a web server for providing access to the staging database and the mailer process via a web browser operated by the product/service provider.

2. The system of claim 1, wherein the value-add process operates on line by accessing the Internet.

3. The system of claim 1, wherein the value-add process operates off line.

* * * * *